March 22, 1938.  C. A. PITTS  2,111,989
CUTTING APPARATUS
Filed Nov. 4, 1936
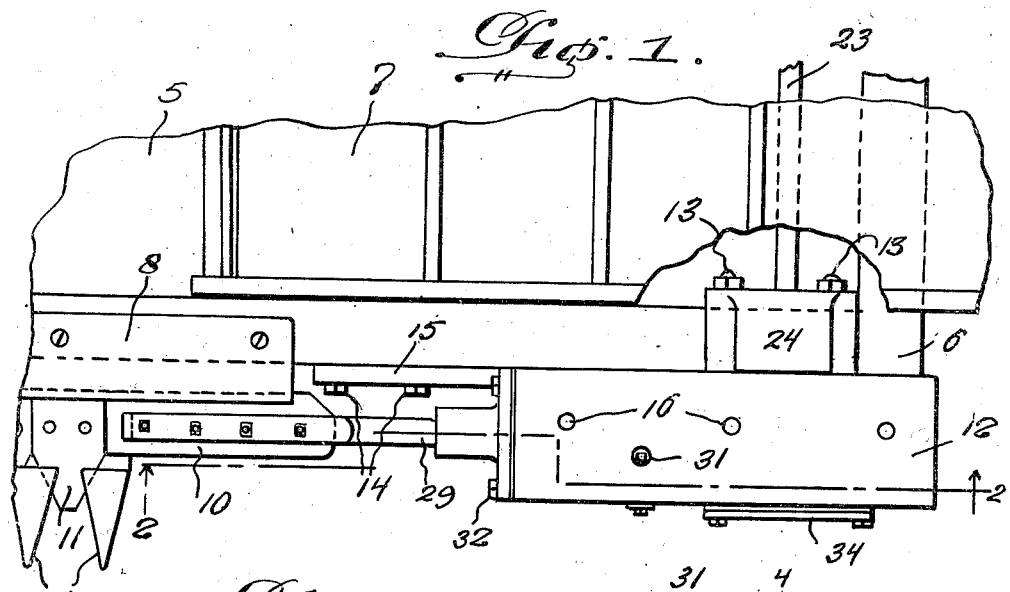
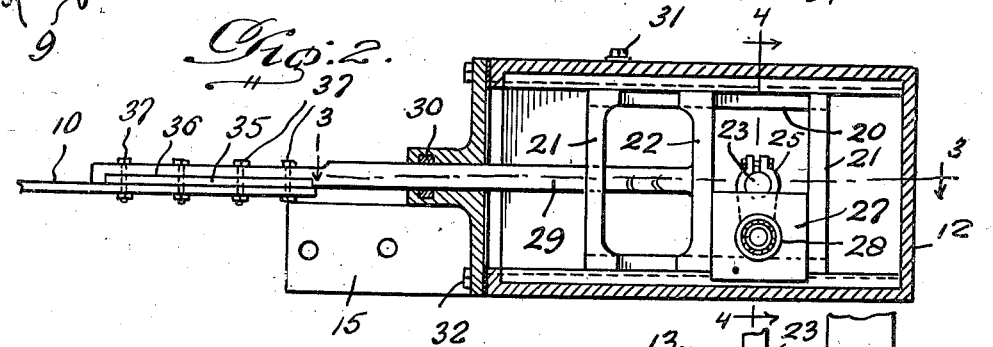
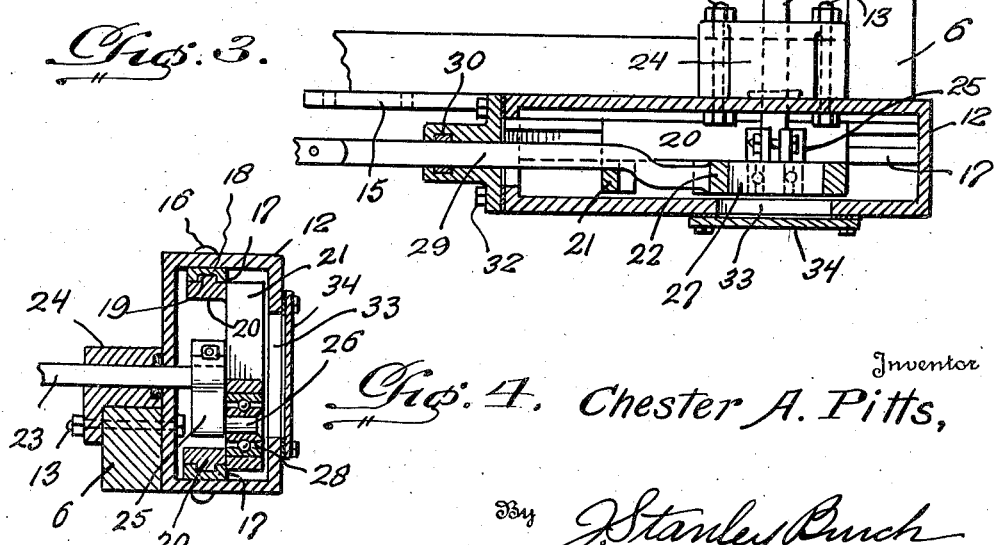
Inventor
Chester A. Pitts,
By J. Stanley Burch
Attorney Patented Mar. 22, 1938

2,111,989

UNITED STATES PATENT OFFICE 2,111,989

CUTTING APPARATUS

Chester A. Pitts, Booker, Tex.

Application November 4, 1936, Serial No. 109,092

4 Claims. (Cl. 56—303)

This invention relates to cutting apparatus for mowing or harvesting machines, and has more particular reference to means for driving the sickle bar of such cutting apparatus.

The primary object of the present invention is to provide an improved sickle bar driving means of the above kind which is simple and compact in construction, efficient in operation, and devoid of the usual pitman which causes considerable difficulty and faulty operation of the cutting apparatus of ordinary mowing and harvesting machines.

A more particular object of the present invention is to provide an improved driving means for sickle bars which may be readily and cheaply embodied in cutting apparatus during initial manufacture, or applied to existing cutting apparatus, and which will operate efficiently for a long period of time without being given a great amount of attention or care.

Other objects and features of the present invention will become apparent from the following description when considered in connection with the accompanying drawing, and the invention consists in the novel form, combination and arrangement of parts hereinafter more clearly described and claimed.

In the drawing:

Figure 1 is a fragmentary top plan view illustrating the sickle bar driving means of the present invention applied to the cutting apparatus of a harvesting machine.

Figure 2 is a section on line 2—2 of Figure 1.

Figure 3 is a horizontal section on line 3—3 of Figure 2; and

Figure 4 is a transverse vertical section on line 4—4 of Figure 2.

Merely for purposes of illustration, I have shown my invention applied to the cutting apparatus of a harvesting machine of the combined type, and only such parts of the harvesting machine are shown as are necessary to a clear understanding of the invention. The harvesting machine includes a platform conveyor 5 having a frame 6 and adapted to receive the grain or the like as it is mowed by the cutting apparatus located at the front of said platform. At one end of the platform conveyor 5 is located an inclined conveyor 7 adapted to receive the mowed grain or the like from the platform conveyor 5 and elevate it to the thrashing or other mechanism of the harvester. The cutting apparatus consists of the usual finger bar 8 having guard fingers 9 and in which is slidably guided the sickle bar 10 provided with cutting knives 11.

The driving means of the present invention includes an elongated casing 12 rigidly secured to the front of the frame 6 of the harvester or mowing machine to which the finger bar 8 is secured, said casing 12 being located at one end of the frame 6 adjacent an end of the finger bar 8 and sickle bar 10. The rigid attachment of casing 12 to the frame 6 in this way may be had by means of bolts 13 respectively extending through the back wall of casing 12 and frame 6 and through an inwardly projecting plate 15 and the frame 6, the plate 15 being rigid with the casing 12 and co-extensive with the back wall of the latter. Longitudinally arranged within and rigidly secured as at 16 to the top and bottom walls of the casing 12 near the back of the latter, are vertically alined horizontal guide rails 17 that extend from end to end of the casing 12. The guide rails 17 have longitudinal grooves 18 in which are slidably engaged or fitted longitudinal guide ribs 19 of an open rectangular slide frame 20 having spaced forwardly offset vertical end members 21 and a similarly offset vertical intermediate member 22.

A forwardly projecting driven shaft 23 of the harvesting or mowing machine, extends through a bearing 24 secured by the bolts 13 on the frame 6 at the back of the casing 12. This shaft 23 projects through the back of casing 12 into the latter, and terminates rearwardly of the vertical members 21 and 22 of the slide frame 20. On this forward terminal of shaft 23 is secured a crank arm 25 having a forwardly projecting crank pin 26. Vertically slidable between the intermediate vertical member 22 of the slide frame 20 and the outer end vertical member 21 of said slide frame 20 is a block 27 having a central opening in which is fitted an anti-friction bearing 28. The crank pin 26 is engaged in the bearing 28, and it will thus be apparent that when shaft 23 is rotated the crank 25, 26 will cause an orbital movement of block 27 so as to effect horizontal reciprocation of guide frame 20 while block 27 is vertically reciprocated between the vertical members 21 and 22 of slide frame 20. Obviously, as the vertical guide members 21 and 22 of slide frame 20 are offset forwardly, they will not interfere with the rotation of crank arm 25.

Rigidly secured, as by welding, to the intermediate vertical member 22 and the inner end member 21 of slide frame 20 is a horizontal operating rod 29 that projects through the inner end of casing 12, and particularly through a stuffing box 30 provided on the inner end wall of casing 12. The outer end portion of rod 29 is laterally offset as shown in Figure 3, the extreme outer end being secured to the inner side of member 22, and the portion of rod 29 near its offset end portion being secured against the rear side of member 21. The casing 12 is thus grease-tight, and may be filled or partially filled with a suitable lubricant so that the moving parts within the casing 12 will be continuously and effectively lubricated so as to minimize wear between relatively movable surfaces of these parts. The casing 12 may have a top opening to facilitate introduction of the lubricant, which opening may be closed by a removable plug 31. Also, to facilitate assembly, the inner end wall of casing 12 may be removably bolted in place as at 32, and the front wall of casing 12 may have a relatively large opening 33 closed by a removable cover plate 34 and located so as to facilitate insertion or removal of the block 27 through the opening 33. In other words, the slide frame 22 may be inserted into the casing 12 through the open inner end of the latter, whereupon the block 27 may be inserted through the opening 33 and engaged with the crank pin 26 as well as arranged between the vertical members 21 and 22 of the slide frame 20. This provides for convenient assembly or dismantling of the driving means in construction of the latter or repairing the same, respectively.

It will be noted that the operating rod 29 is parallel with the sickle bar 10 so that these parts are arranged to reciprocate in the same direction, thereby permitting direct actuation of the sickle bar 10 by means of the operating rod 29 when the projecting inner end of rod 29 is rigidly secured or attached to the adjacent end of sickle bar 10. For the latter purpose, the adjacent end of sickle bar 10 is provided with an upstanding longitudinal rib 35 which may consist of a bar welded upon this end of the sickle bar 10. The projecting inner end portion of operating rod 21 has a recess in the under side thereof within which the rib 35 snugly seats so as to provide an interlocking or interengaging connection between the operating rod 29 and the bar 10. This recess is indicated at 36, and bolts 37 may be passed through the rod 29, rib 35 and sickle bar 10 so as to maintain the sickle bar and operating rod in this interengaging or interlocking relation. In this way, there will be no shearing strain placed upon the bolts 37, and the connection between the rod 29 and the sickle bar 10 will not be readily destroyed under the severe conditions or strains which are incident to ordinary use or operation of the cutting apparatus.

By making a direct connection with the sickle bar with the latter and the operating rod in substantially the same plane, the sickle bar will be smoothly driven with the rod 29 allowed practically no lateral vibration or play due to the guiding of rod 29 in the stuffing box 30 and the attachment of rod 29 to slide frame 20 which is effectively guided in the casing 12. There is very little opportunity for any of the moving parts to bind, and the small amount of wear which takes place is at several separated points. This is of considerable advantage over constructions employing a pitman in which the wear is practically all at one point so that the parts become loose and impart a jerky movement to the sickle bar.

From the foregoing description, it is believed that the construction and operation, as well as the advantages of the present invention will be readily understood and appreciated by those skilled in the art. While I have specifically illustrated and described a preferred embodiment of the present invention, it will be understood that many details thereof may be varied without departing from the spirit and scope of the invention as claimed.

What I claim as new is:

1. In a cutting apparatus for mowing or harvesting machines, wherein a sickle bar is reciprocable relative to a finger bar, means for reciprocating said sickle bar including a horizontally elongated grease-tight casing having means to rigidly secure the same to the mowing or harvesting machine near one end of said sickle bar and provided with a stuffing box at its inner end, a slide frame arranged within and guided for reciprocating movement longitudinally of said casing, said slide frame including spaced vertical guide members, a block vertically reciprocable between said vertical guide members and having a central bearing, a driven shaft projecting into said casing and having a crank secured thereon within said casing, said crank having a crank pin journaled in the bearing of said block, an operating rod rigid with said slide frame and projecting through the stuffing box at the inner end of the casing, and means to rigidly secure the projecting end of said operating rod directly to the adjacent end of the sickle bar.

2. In a cutting apparatus for mowing or harvesting machines, wherein a sickle bar is reciprocable relative to a finger bar, means for reciprocating said sickle bar including a horizontally elongated casing having means to rigidly secure the same to the mowing or harvesting machine near one end of said sickle bar, a slide frame arranged within and guided for reciprocating movement longitudinally of said casing, said slide frame including spaced vertical guide members, a block vertically reciprocable between said vertical guide members and having a central bearing, a driven shaft projecting into said casing and having a crank secured thereon within said casing, said crank having a crank pin journaled in the bearing of said block, an operating rod rigid with said slide frame and projecting outwardly through an end of the casing, and means to rigidly secure the projecting end of said operating rod directly to the adjacent end of the sickle bar, guide ribs on the top and bottom walls of said casing and provided with guide grooves, said slide frame having top and bottom rails provided with guide ribs engaging in said guide grooves.

3. In a cutting apparatus for mowing or harvesting machines, wherein a sickle bar is reciprocable relative to a finger bar, means for reciprocating said sickle bar including a horizontally elongated casing having longitudinal top and bottom guides therein and provided with means to rigidly secure the same to the mowing or harvesting machine near one end of said sickle bar, a slide frame arranged within said casing and having top and bottom members and guided in said guides for reciprocating movement longitudinally of said casing, said slide frame including spaced vertical guide members, a block vertically reciprocable between said vertical guide members and having a central bearing, a driven shaft projecting into said casing and having a crank secured thereon within said casing, said crank having a crank pin journaled in the bearing of said block, an operating rod rigid with said slide frame and projecting outwardly through an end of the casing, and means to rigidly secure the projecting end of said operating rod directly to the adjacent end of the sickle bar, said vertical guide members of the slide frame being offset forwardly in a plane forwardly of said top and bottom members of the plane of said crank arm.

4. In a cutting apparatus for mowing or harvesting machines, wherein a sickle bar is reciprocable relative to a finger bar, means for reciprocating said sickle bar including a horizontally elongated casing having means to rigidly secure the same to the mowing or harvesting machine near one end of said sickle bar, a slide frame arranged within and guided for reciprocating movement longitudinally of said casing, said slide frame including spaced vertical guide members, a block vertically reciprocable between said vertical guide members and having a central bearing, a driven shaft projecting into said casing and having a crank secured thereon within said casing, said crank having a crank pin journaled in the bearing of said block, an operating rod rigid with said slide frame and projecting outwardly through an end of the casing, and means to rigidly secure the projecting end of said operating rod directly to the adjacent end of the sickle bar, said casing being of grease-tight construction and having an end stuffing box through which said operating rod slidably extends, said operating rod being rigidly attached to vertical members of said slide frame.

CHESTER A. PITTS.